March 1, 1949.  E. W. MILLARD  2,463,294
GASOLINE TURBINE ENGINE

Filed April 26, 1944  2 Sheets-Sheet 1

INVENTOR.
Edgar W. Millard
BY
ATTORNEY

March 1, 1949.  E. W. MILLARD  2,463,294
GASOLINE TURBINE ENGINE
Filed April 26, 1944  2 Sheets-Sheet 2
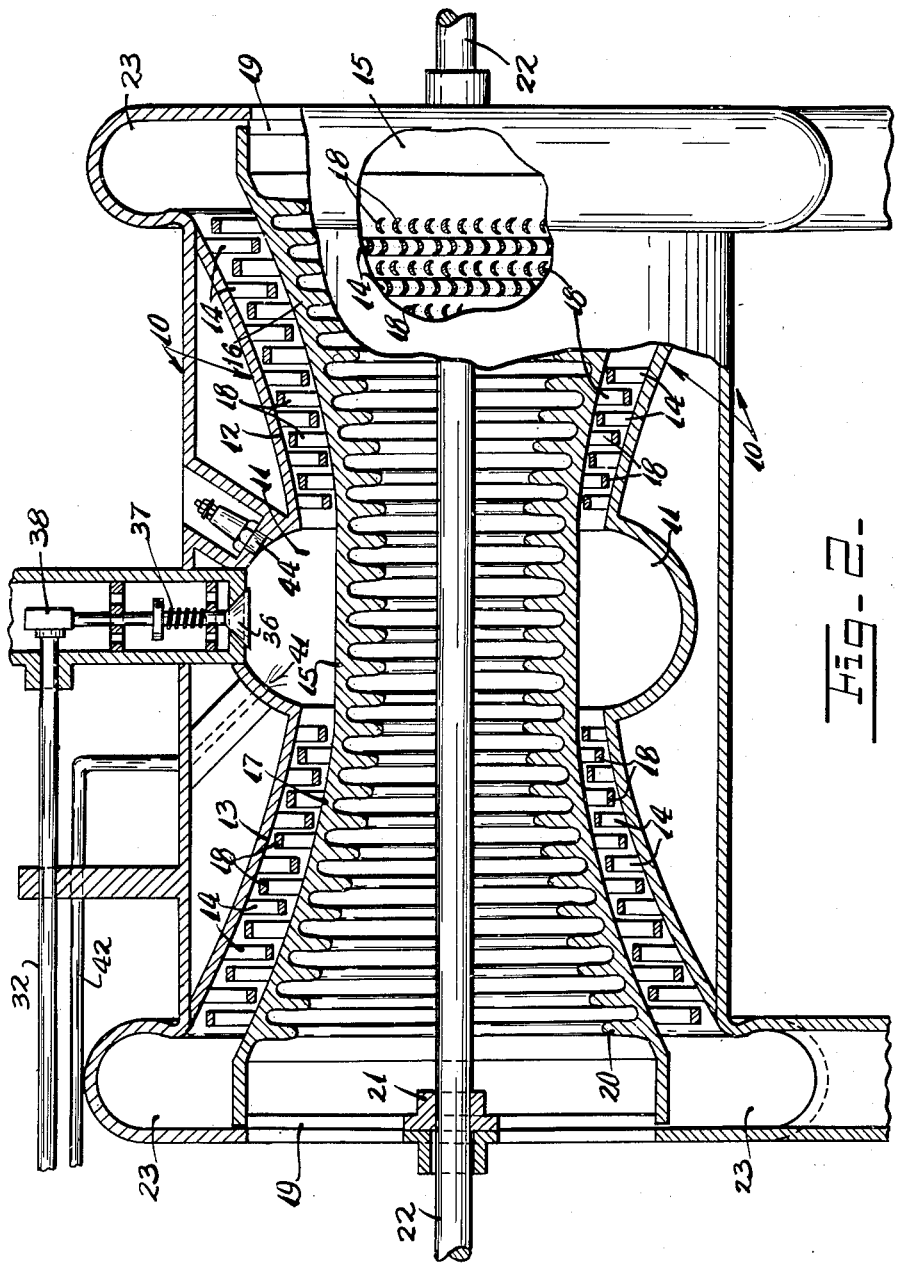
Fig-2-
INVENTOR.
Edgar W. Millard
BY
ATTORNEY Patented Mar. 1, 1949

2,463,294

UNITED STATES PATENT OFFICE 2,463,294

GASOLINE TURBINE ENGINE

Edgar W. Millard, Elyria, Ohio

Application April 26, 1944, Serial No. 532,913

1 Claim. (Cl. 60—41)

This invention relates to new and useful improvements in a gasoline turbine engine.

More particularly, the invention proposes an improved gasoline turbine engine which is characterized by a stator having an axial tubular passage provided with an annular central combustion chamber communicating with expanding end sections having series of turbine nozzles, and a rotor rotatively mounted through said stator and having expanding end sections complementary to the end sections of said stator and provided with turbine buckets cooperatively positioned in relation to said nozzles. It is further proposed to provide means for burning fuel within said combustion chamber to produce gases for passing through said nozzles and buckets to drive said rotor.

The new and improved gasoline turbine engine is especially applicable to aircraft engines, though it could be used for other purposes.

It is pointed out that the turbine engine must be provided with a cooling system the design of which may be optional. It may be air or liquid cooled and may be cooled according to any number of different methods.

The particular method of burning the fuel within the combustion chambers is also optional. A system may be used in accordance with the injection type of carburization or the common type of mixture may be used.

While one particular design of gasoline turbine engine is disclosed which makes use of but one stator and rotor, it should be clear that additional stators and rotors may be provided. The rotors may be attached to a central drive shaft.

The new and improved gasoline turbine engine may utilize one or more superchargers, an ignition system, oil pumps, etc., as is common in engines.

An important feature of the new and improved gasoline turbine engine resides in the fact that the gases expand both ways from the combustion chamber. Therefore there is less recoil, vibrations, etc. In the particular design of gasoline turbine engine shown it is proposed to use cooling fins internally of the rotor, so that the rotor may be cooled by the air passing through the rotor.

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 3 is a fragmentary longitudinal vertical enlarged sectional view of another portion of Fig. 1.

Figure 1:
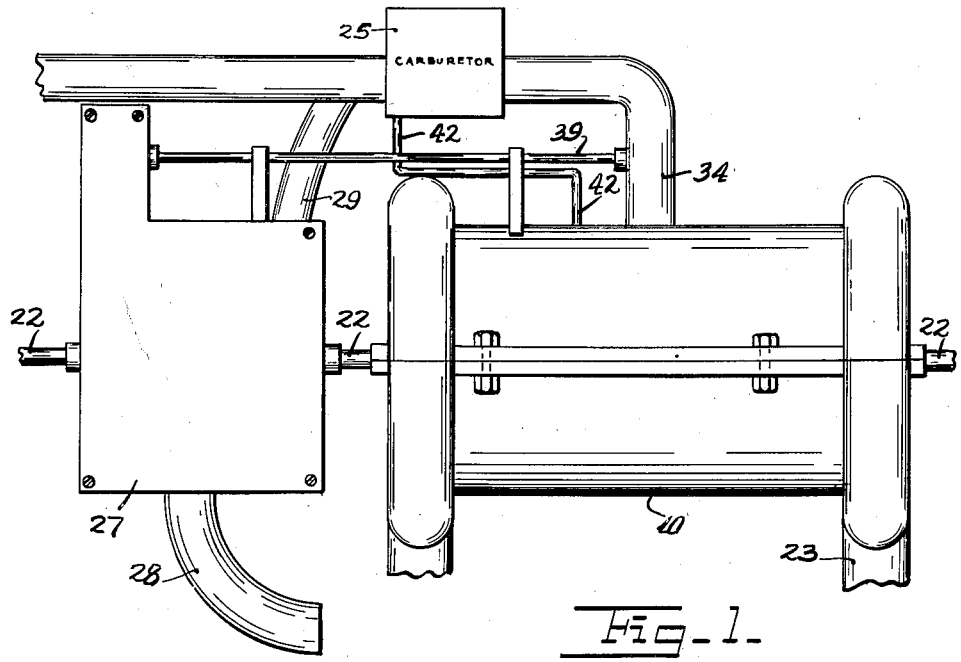
Fig. 1 is a side elevational view of a gasoline turbine engine constructed in accordance with this invention.
Figure 2:
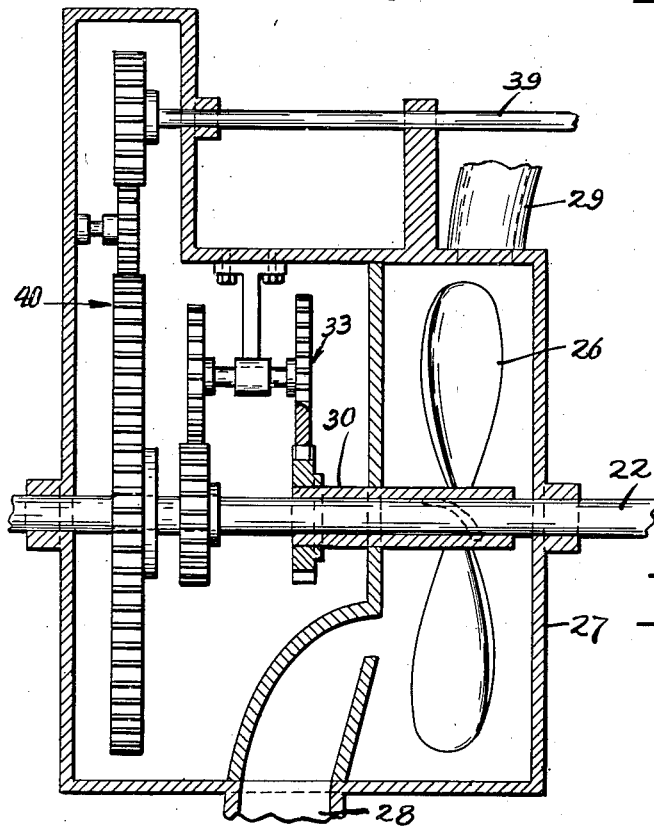
Fig. 2 is a fragmentary longitudinal vertical enlarged sectional view of a portion of Fig. 1.

The gasoline turbine engine, according to this invention, includes a stator 10 having a tubular axial passage provided with an annular central combustion chamber 11 communicating with expanding end sections 12 and 13 having series of turbine nozzles 14. A rotor 15 is rotatively mounted through said stator 10 and is provided with expanding end sections 16 and 17 complementary to said end sections 12 and 13 respectively. The rotor 15 is provided with turbine buckets 18 cooperatively positioned in relation to the nozzles 14.

The rotor 15 has web-like ends 19 through which air may pass. Internally, the rotor 15 is formed with a plurality of air cooling fins 20. The web-like ends 19 are provided with hub portions 21 mounted on a main driven shaft 22. The cross sectional areas between the expanding end portions 12 and 13 of the stator and the portions 16 and 17 of the rotor gradually expand in accordance with the natural expansion of the gases as they travel through the nozzles 14 and buckets 18, in accordance with standard turbine design. The exhausted gases are carried away by an exhaust 23 at each end of the stator 10.

The means for burning fuel within the combustion chamber 11 includes a carburetor 25. A supercharger impeller 26 is mounted about the drive shaft 22 and is located within a casing 27 having an inlet 28 and a discharge 29 connected with the air to the carburetor 25. More specifically, the supercharger impeller 26 is mounted on a tube 30 which is rotative on the shaft 22. A high speed gear train 33 drives the tube 30 from the rotations of the shaft 22.

The combustion chamber 11 has one or more inlets 34 connecting up with the carburetor 25. Each of these inlets is controlled by a valve 36 urged into a closed position by a spring 37. A cam 38 is for the purpose of opening the valve 36. The cam 38 is mounted on a cam shaft 39 which is connected up with a cam shaft drive system 40 connected up with the drive shaft 22. The combustion chamber 11 is also provided with a fuel injector nozzle 41 connected by the pipe line 42 with the carburetor 25.

The details of the carburating system will not be given in this specification since they form no part of the invention. The fuel within the combustion chamber 11 is ignited by an ignition system not disclosed in detail, but including a spark plug 44 communicating with the combustion chamber 11.

Further details of the turbine engine will not be given in this specification because they form no part of the invention and those skilled in the art of engine design will readily comprehend that the present engine must be provided with an ignition system, fuel pump, and other devices generally used on engines at the present time.

The operation of the new and improved gasoline turbine engine is as follows:

The combustion chamber 11 is supplied with fuel which is then ignited to form large quantities of gas. This gas passes between the expanding end portions 12, 16 and 13, 17 so as to pass through the stationary nozzles 14 to drive the buckets 18 so as to drive the rotor 15. The exhausted gases will pass out through the exhausts 23. The dominating feature of the invention resides in the provision of the centrally located combustion chamber 11 in combination with the expanding end portions through which the gases pass.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a gasoline turbine engine, a stator housing presenting a central combustion chamber, laterally extending chambers flared outwardly from said central chamber, a rotor mounted axially in said housing and extending through said combustion and lateral chambers, cooperating turbine buckets and nozzles respectively on the outer wall of said rotor and on the inner wall of said laterally extending chambers, a shaft on which the rotor is mounted, said rotor being hollow and being outwardly flared from its center toward its ends to conform to the flared shape of said lateral chambers and being shaped to provide inwardly extending annular ridges constituting cooling fins, fuel supply and exhaust means opening from said combusting chamber and the ends of the housing adjacent the opposite outer ends of the stator constituting exhaust passages leading from said cooperating turbine buckets and nozzles at opposite sides of said central combustion chamber.

EDGAR W. MILLARD.

REFERENCES CITED

The following references are of record in the file of this patent:

UNITED STATES PATENTS

| Number | Name | Date |
| --- | --- | --- |
| 871,030 | Burger | Nov. 12, 1907 |
| 1,726,104 | Harris | Aug. 27, 1929 |

FOREIGN PATENTS

| Number | Country | Date |
| --- | --- | --- |
| 536,238 | Great Britain | May 7, 1941 |
| 336,780 | France | Jan. 27, 1904 |
| 499,054 | Germany | May 31, 1930 |